United States Patent [19]

Agahi et al.

[11] Patent Number: 5,559,912
[45] Date of Patent: Sep. 24, 1996

[54] WAVELENGTH-SELECTIVE DEVICES USING SILICON-ON-INSULATOR

[75] Inventors: Farid Agahi, Danbury; Bardia Pezeshki, Stamford, both of Conn.; Jeffrey A. Kash, Pleasantville, N.Y.; Jeffrey J. Welser, Greenwich, Conn.

[73] Assignee: International Business Machines Corporation, Armonk, N.Y.

[21] Appl. No.: 529,933

[22] Filed: Sep. 15, 1995

[51] Int. Cl.[6] .............................. G02B 6/26; H04J 14/02
[52] U.S. Cl. .......................... 385/42; 385/14; 385/31; 385/49; 385/50; 385/131; 359/115; 359/124
[58] Field of Search ................................ 385/14, 15, 16, 385/24, 27, 31, 39, 40, 42, 49, 50, 129, 130, 131, 132, 141; 359/115, 127, 124, 117

[56] References Cited

U.S. PATENT DOCUMENTS

| | | | |
|---|---|---|---|
| 3,864,019 | 2/1975 | Smolinsky et al. | 385/49 X |
| 3,912,363 | 10/1975 | Hammer | 385/49 X |
| 4,006,964 | 2/1977 | Mahlein et al. | 385/43 |
| 4,159,452 | 6/1979 | Logan et al. | 385/131 X |
| 4,701,009 | 10/1987 | Tangonan et al. | 385/14 X |
| 5,078,516 | 1/1992 | Kapon et al. | 385/129 |
| 5,182,787 | 1/1993 | Blonder et al. | 385/131 |
| 5,214,725 | 5/1993 | Yanagawa et al. | 385/45 |
| 5,253,314 | 10/1993 | Alferness et al. | 385/40 |
| 5,265,177 | 11/1993 | Cho et al. | 385/14 |
| 5,332,690 | 7/1994 | Cho et al. | 385/131 X |
| 5,333,216 | 7/1994 | Sakata et al. | 385/28 |
| 5,343,542 | 8/1994 | Kash et al. | 385/31 |
| 5,355,424 | 10/1994 | Idler et al. | 385/14 |

*Primary Examiner*—Brian Healy
*Attorney, Agent, or Firm*—Douglas W. Cameron

[57] ABSTRACT

This invention describes how commercial silicon-on-insulator material can be used to fabricate both wavelength filters and wavelength-selective photodetectors. The silicon-on-insulator substrates have a buried silicon dioxide layer and a thin top silicon layer and are manufactured for high speed electronics applications. However, in this invention, the thin silicon layer is used as the core of a waveguide and the buried silicon dioxide as a lower cladding region. Another cladding layer and a low index waveguide is fabricated on the commercial substrate to form an asymmetric waveguide coupler structure. The added low index waveguide and the original thin silicon layer form the two waveguides of the coupler. Since the the two waveguide materials have very different indices of refraction, they are only phase-matched at one wavelength. Thus for a given thickness of materials, only one wavelength couples between the two waveguides. By adding an absorptive layer in the silicon waveguide and electrical contacts, wavelength sensitive photodetection is obtained. The buried insulator layer is the key to device operation, providing a very low index buried cladding region.

9 Claims, 5 Drawing Sheets

WAVELENGTH-SELECTIVE DEVICES USING SILICON-ON-INSULATOR

TECHNICAL FIELD

This invention relates to a method and apparatus used to filter and detect optical communication signals at specific wavelengths.

BACKGROUND OF THE INVENTION

In the same way that different carrier frequencies are used to provide many radio communication channels over the same airways, different wavelengths of light can also carry different channels over the same optical fiber. Unfortunately, in optical systems there is no simple analogous device to the electronic tuned circuit for channel selection. The available optical devices are costly to manufacture, tend to use expensive materials, and frequently lack in performance.

In waveguide structures, frequency selective elements are usually fabricated using some form of integrated diffraction gratings. Such elements are generally quite large and difficult to make. Frequently, gratings are fabricated using electron beam or holographic lithography along the length of a waveguide. A single grating acts as a band-stop filter, reflecting a band of wavelengths that match the grating spacing, and transmitting the rest. (e.g. U.S. Pat. No. 5,416,866 to Sahlen et. al.) A narrow band-pass filter can be constructed using two such filters shifted by an integral number of half-waves. Such a filter rejects a relatively wide band where each of the gratings is reflective, and transmits a narrow band that corresponds to the spacing between the two grating mirrors. Since the grating period must be on the order of the optical wavelength in the material, fabricating such devices requires complex sub-micron lithography.

Planar waveguide structures have also been used for wavelength selection. In these devices the light travels along a two dimensional surface and particular wavelengths are diffracted at different angles. The most common implementations require either a lithographic grating in a Rowland circle configuration "Monolithic InP/InGaAsP/InP grating spectrometer for the 1.48–1.56 mm wavelength range," Applied Physics Letters, vol. 58, p. 1949–51, 1991), or a waveguide phased-array. ("Integrated optics NxN multiplexer on silicon," C. Dragone et al., IEEE Photonics Technology Letters, vol. 3, p. 396–399, 1991.) Compared to single element gratings, these devices can filter a number of wavelengths simultaneously, however, the consume a large rectangular area and also require precision lithography.

A fundamentally different kind of filter relics on wavelength-sensitive coupling between two waveguides. In a directional coupler, two waveguides are fabricated close to each other to allow evanescent field coupling between the two guides. If the waveguides are similar then each wavelength of light will have the same propagation constant in both waveguides, and light will completely couple from one waveguide to the next. By breaking the symmetry in such a directional coupler, wavelength selectivity can be obtained. With dissimilar waveguides, the propagation constants are different in the two waveguides at all wavelengths except for one, and only that wavelength will couple between the guides. Wavelength sensitive behavior in such asymmetric waveguide couplers is generally well known (U.S. Pat. No. 3,957,341), but their use has been limited since the devices are long and often do not have the required wavelength resolution. If device size can be reduced from many millimeters to hundreds of microns, it becomes possible to cascade devices in series for multiple wavelength operation. As one might expect, the more dissimilar the two materials in the waveguides, the higher the resolution and the shorter the length, but in most material systems one cannot vary the refractive index of the materials for the waveguides by large amounts. For example, in the lithium niobate system, waveguides are formed by diffusing titanium to form high index regions and such a coupler has been demonstrated (U.S. Pat. No. 4,146,297) with a relative wavelength resolution ($\delta\lambda/\lambda$) of 1/30 at a device length of 1.5 cm. ("Tunable optical waveguide directional coupler filter," R. C. Alferness et al., Applied Physics Letters, vol. 33, p. 161–163, 1978). In semiconductors, a higher refractive index variation is obtainable and a relative wavelength resolution of 1/850 can obtained with a length of 5 mm "InGaAsP/InP vertical directional coupler filter with optimally designed wavelength tunability", C. Wu et al., IEEE Photonics Technology Letters, vol. 4, p. 457–460, 1993). The wavelength selectivity and device length trade-off can be expressed as:

$$\frac{L}{\lambda} \frac{\delta\lambda}{\lambda} = \frac{5n_1}{2\pi(n_2^2 - n_1^2)} \quad (1)$$

where L is the device size, $\delta$ is the wavelength, $\delta\lambda$ is the wavelength resolution, and $n_1$ and $n_2$ are the refractive indices of the low index and high index waveguides respectively.

In addition to size, many optical filters are costly since they require rare and expensive compound semiconductor materials. These compound semiconductors are usually lattice matched alloys, typically indium phosphide or gallium arsenide based, where the composition of the material can be varied during crystal growth to make a variety of waveguiding structures. In contrast to the compound semiconductors, silicon is much lower cost and can be obtained in large standard wafers, but waveguides made on silicon using various glasses do not have the required range of refractive indices for asymmetric waveguide filters.

U.S. Pat. No. 3,957,341 describes the basic operating characteristics of an asymmetric directional coupler, and how the device can be used as an optical filter.

U.S. Pat. No. 4,146,297 explains how the asymmetric directional coupler can be implemented in the lithium niobate material system, and how the addition of electrodes can provide tuning.

U.S. Pat. No. 5,234,535 describes a process where silicon-on-insulator substrates can be prepared.

U.S. Pat. No. 5,343,542 by Kash describes a device wherein different wavelengths of light are filtered from a waveguide sequentially.

U.S. Pat. No. 5,416,866 teaches how diffraction gratings can be fabricated in waveguides and specifically shows how two gratings used in sequence can the increase tuning range of a filter.

SUMMARY OF THE INVENTION

It is the aim of this invention to provide simple filters and wavelength-selective photodetectors that can be manufactured at low cost in commercial silicon substrates with adequate performance for receivers in multi-wavelength systems. This invention provides a method for fabricating asymmetric directional coupler filters in silicon that can possess high resolution with a small device size. Such filters can be cascaded for multiple wavelength operation, and using silicon-germanium alloys, can be configured to act as photodetectors at the technologically important 1.3 µm and 1.55 µm communication wavelengths.

The fundamental component of this invention is an asymmetric directional coupler that utilizes silicon-on-insulator (SOI) substrates (see U.S. Pat. No. 5,234,535). This material is commercially available for the manufacture of high speed electronic integrated circuits, and can be obtained at low cost in large substrate sizes from various vendors. In the SOI manufacturing process two standard silicon wafers are oxidized and then bonded together to form a sandwich with an intermediate layer of silicon dioxide. One of the wafers is then thinned down to form an active layer on the order of a micron in thickness with an underlying silicon dioxide layer.

The invention uses the thin silicon layer of SOI substrates as the core of one of the waveguides of an asymmetric directional coupler filter. The structure is completed by adding a cladding layer on top of the silicon and forming another waveguide. Such an asymmetric waveguide structure will have silicon as one of the waveguides and a low index dielectric as the other waveguide. The high degree of asymmetry leads to excellent wavelength selectivity and a short device length. Such a device can be made tunable by the adding electrical contacts using standard silicon processing, and injecting an electrical current into the silicon waveguide. The electrical carriers cause the optical thickness of the silicon to decrease and thus vary the wavelength of operation. Similarly, if the silicon is slightly absorbing at the wavelength range of interest, the contacts can be reverse biased to collect photo-generated carriers, thus forming a wavelength selective photodetector. Since the device can be made very short, a number of such detectors can be cascaded in series, with each detector having a slightly different thickness of silicon. Such a structure resembles tapered resonator filters (U.S. Pat. No. 5,343,542) previously described, in which different wavelengths are extracted from the low index waveguide at different points along the device. Due to the very high asymmetry of our device, with $n_1$ typically 1.6 and $n_2$ equal to 3.5, such a filter is more than 1000 times as selective as its dielectric counterparts, and better than 30 times as selective as semiconductor asymmetric coupler filters.

DESCRIPTION OF THE PREFERRED EMBODIMENT

Figure 1:
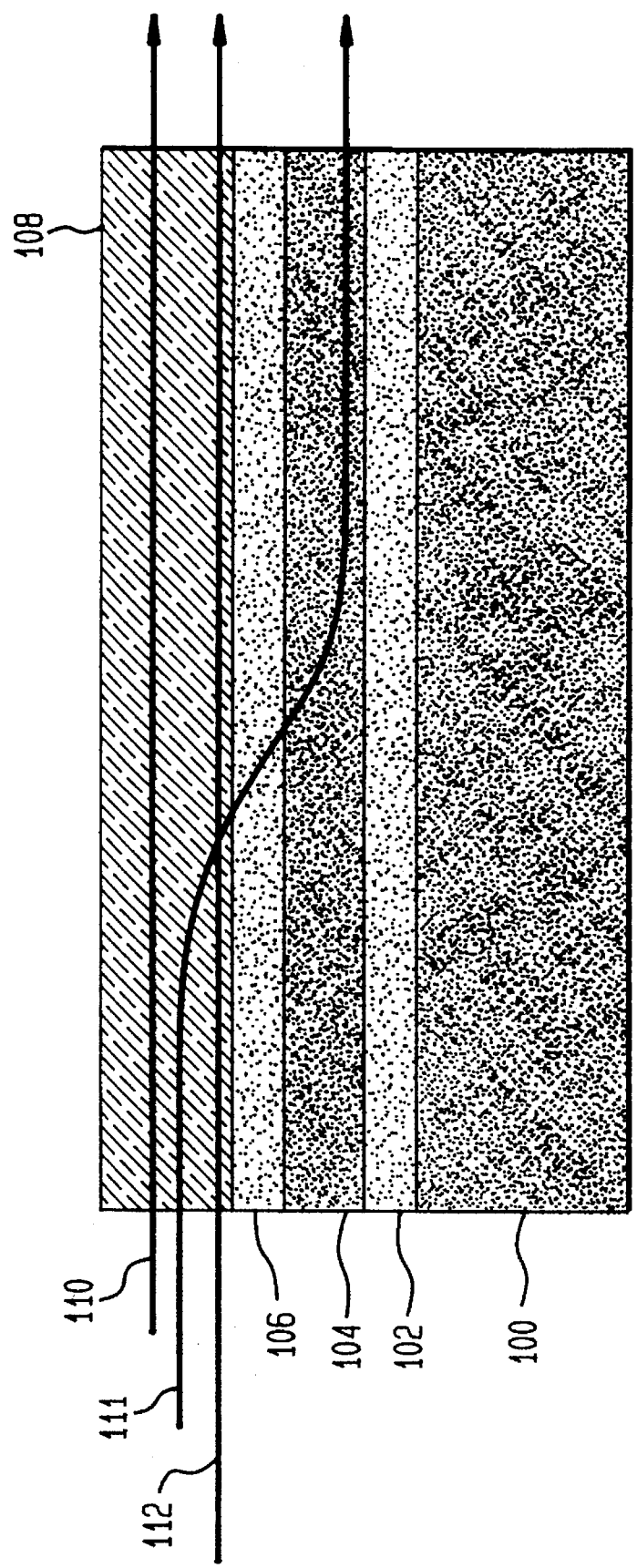
FIG. 1 shows a cross section of a filter using silicon-on-insulator material.

The basic filter of this invention is shown in cross section in FIG. 1. A standard SOI wafer consisting of a silicon substrate (100), a buried silicon dioxide layer (102), and an active silicon layer (104), is further oxidized to have an additional silicon dioxide layer (106). A low index dielectric material (108) is then deposited on the structure to form a top waveguide. Such a layer can be a doped glass such as Ge:SiO$_2$, silicon oxynitride (SION), or a polymer—the only constraint is that the material be transparent and have a slightly higher refractive index than silicon dioxide inorder to act as a waveguide. The structure now resembles an asymmetric directional coupler filter. The silicon layer (104) forms the core of one waveguide, with SiO$_2$ layers (102) and (106) as the cladding regions, while the low index dielectric (108) acts as the other waveguide, with cladding layer (106) controlling the coupling between the two waveguides. If a number of wavelengths (110–112) of light is coupled to the top waveguide (108) then only one of the wavelengths, in this case (111), couples to the silicon waveguide (104).

The thickness of the layers for particular applications can be calculated using standard waveguide calculation techniques (see for example "vertical cavity devices as wavelength selective waveguides", B. Pezeshki et al., IEEE Journal of Lightwave Technology vol. 12 p. 1791–1801, 1994). The thickness of the lower silicon waveguide (104) determines the wavelength that is selected. To the first approximation, if this thickness is increased by 1%, then the selected wavelength also increases by 1%. In general, if this layer is relatively thick, the waveguide (104) becomes multi-mode and more than one-wavelength will be selected. The thickness then also determines the free-spectral range, or the wavelength separation between resonant wavelengths, the thicker this region is, the smaller the separation between these wavelengths. The thickness of the coupling region (106) determines the coupling and wavelength resolution of the device. If this SiO$_2$ layer is made thicker the coupling is reduced and the wavelength resolution is increased, in accordance with equation 1. For a simple lossless directional coupler, the lower SiO$_2$ region (102) needs to be thick enough to cause negligible loss from the lower silicon waveguide core (104) in a coupling length. The thickness of the top waveguide is not crucial and does not critically affect device performance, but typically 5 μm should provide good external coupling to an optical fiber.

Figure 2:
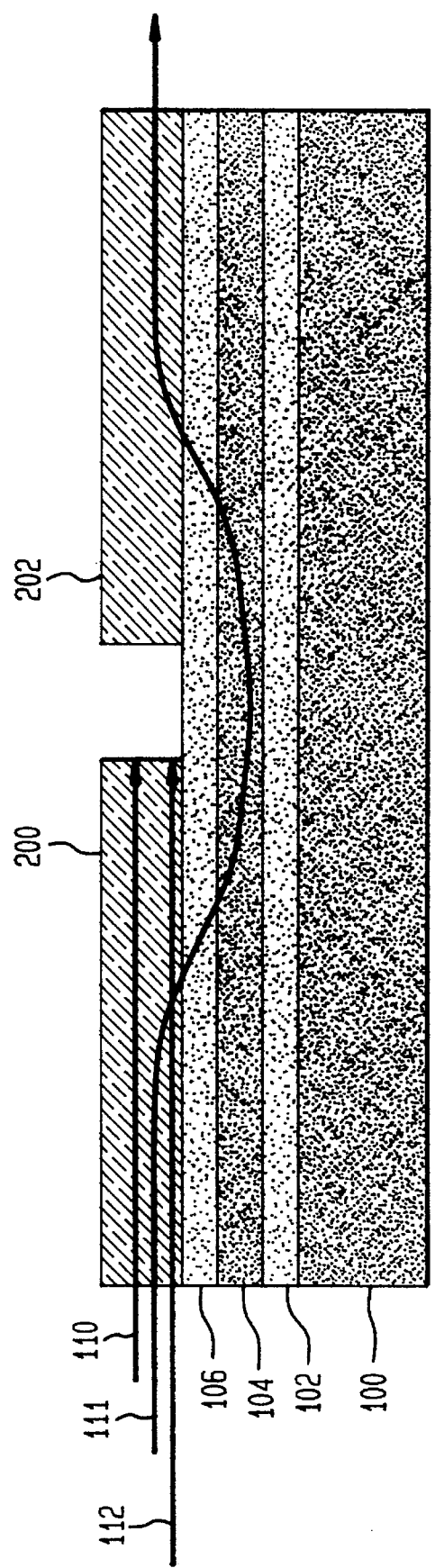
FIG. 2 describes how such a filter can select one wavelength out of many, with both the input and output connected to the top low index waveguide.

The filter described above will select a particular wavelength (111) out of the top waveguide (108) into the lower waveguide core (104). The top waveguide (108), on account of its low index and large thickness is easy to couple to optical fibers, and one would ideally like to couple the input and output of the filter to this top waveguide. With the input and output connected to the top waveguide (108), the filter described above acts as a channel dropping filter. To obtain the opposite band-pass characteristic with the same connections, one needs to modify the structure to that shown in cross section in FIG. 2. In this case the device is made to be two coupling lengths long, and the top waveguide (previously 108) is now split in length into two sections (200) and (202). The input wavelengths of light (110–112) enter waveguide (200), and only one particular wavelength (111) couples to the lower waveguide (104). The rest are absorbed in the split between the two sections (200) and (202). The selected wavelength then couples back from the lower silicon waveguide (104) into the second section of the top waveguide (202) and can then exit the device. Such a structure will allow band-pass operation while coupling only to the low index top waveguide sections (200) and (202).

Figure 3:
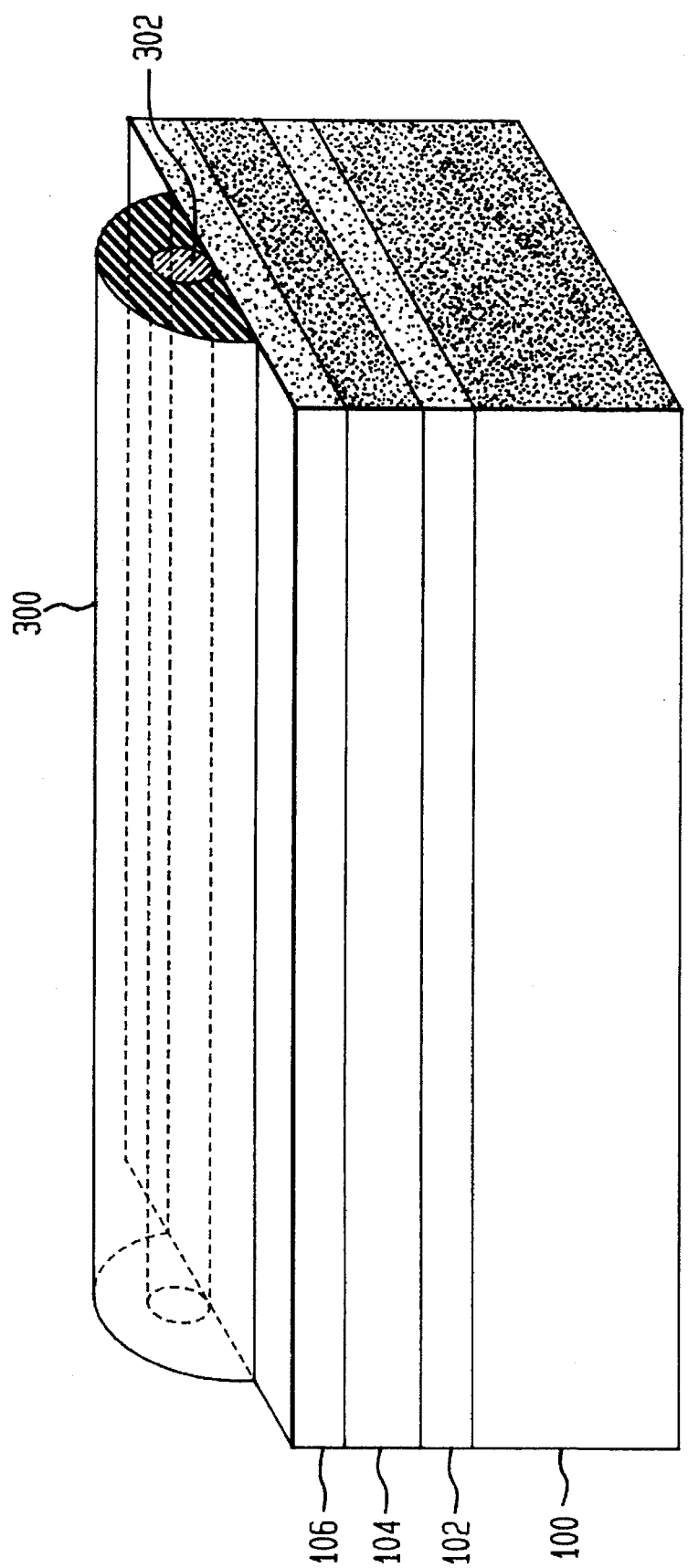
FIG. 3 is a diagram of a filter where the top waveguide has been replaced by a D-shaped optical fiber.

A alternative implementation of the filter replaces the top waveguide (108) by a modified optical fiber (300). Shown in FIG. 3, an optical fiber is polished on one side to form a D-shape, exposing the core (302). The fiber is then simply glued to the processed SOI material. Specific wavelengths of light are extracted from the fiber core (302) and enter the lower waveguide (104). Since a substantial cost of optical components stems from the high accuracy required in coupling the fiber to the device, by keeping the light in the fiber, one can eliminate the costly alignment process.

Such a filter can also be made tunable with current injection. As mentioned previously, the wavelength of the selected light depends on the optical thickness of the silicon core region (104). If this optical thickness is changed by injecting carriers, then the device tunes to a new wavelength. Adding current injection to such a structure requires only standard silicon processing, resulting in the structure shown in FIG. 4. With an originally undoped silicon layer (104), an n-type (400) and p-type (402) regions are formed on either side of the device. A depletion region (404) forms between the n and p regions in the silicon layer under the top waveguide. This depletion region has a slightly higher index than the adjacent doped regions (400) and (402) and thus acts as a waveguide laterally. Carriers can then be injected into the depletion region by forward biasing the diode formed by the n and p type implants. These carriers change the refractive index and change the phase-matched wavelength to a different value.

Figure 4:
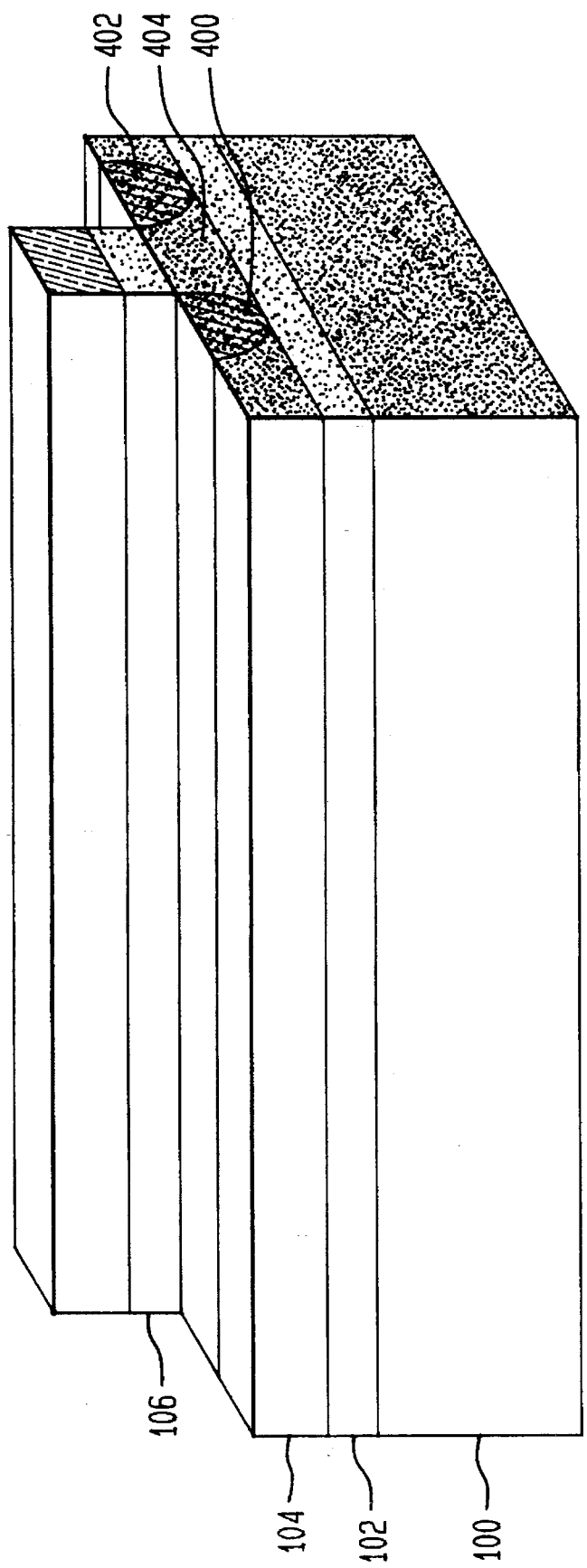
FIG. 4 shows a filter where doped regions are added to provide for current injection and electrical tuning. The same structure can be used as a wavelength selective photodetector if the contacts are reverse biased and the light is absorbed in the silicon.

The filters discussed previously are useful in multi-wavelength networks to route different wavelengths from one fiber to another. To ultimately receive the signal, one also requires a wavelength sensitive photodetector. Since our structure uses a semiconductor as one of the waveguides, the same structure as shown in FIG. 4 can be used as wavelength-selective photodetector. In this case two modifications are required. Primarily the silicon waveguide (104) must be made to slightly absorb the wavelength of interest. This can be achieved either by operating the device at a wavelength just above the bandgap of silicon (0.95 µm–1.06 µm), or by inserting in the silicon thin layers of silicon-germanium alloy. Such silicon-germanium quantum wells cause absorption at the technologically important communication wavelengths of 1.3 µm and 1.55 µm. Ordinary waveguide photodetectors that operate at these wavelengths and use silicon-germanium alloys are known in the art, and the amount of absorption can be adjusted by controlling the composition and number of quantum wells (see "Integrated rib waveguide-photodetector using Si/SiGe multiple quantum wells for long wavelengths", V. P Kesan et al. Materials Research Society Symposium Proceedings, vol. 220, p. 483–488, 1991). Adding a low index top waveguide to such photodetectors fabricated on SOI allows wavelength-selective photodetection at these communication wavelengths. Typical design rules are such that the absorption length of the light in the silicon waveguide must be on the order of the coupling length (see "vertical cavity devices as wavelength selective waveguides", B. Pezeshki et al., IEEE Journal of Lightwave Technology vol. 12 p. 1791–1801, 1994). To operate as a photodetector, instead of forward biasing the p and n regions (400, 402), one needs to apply a reverse bias voltage to collect the photogenerated carriers.

Figure 5:
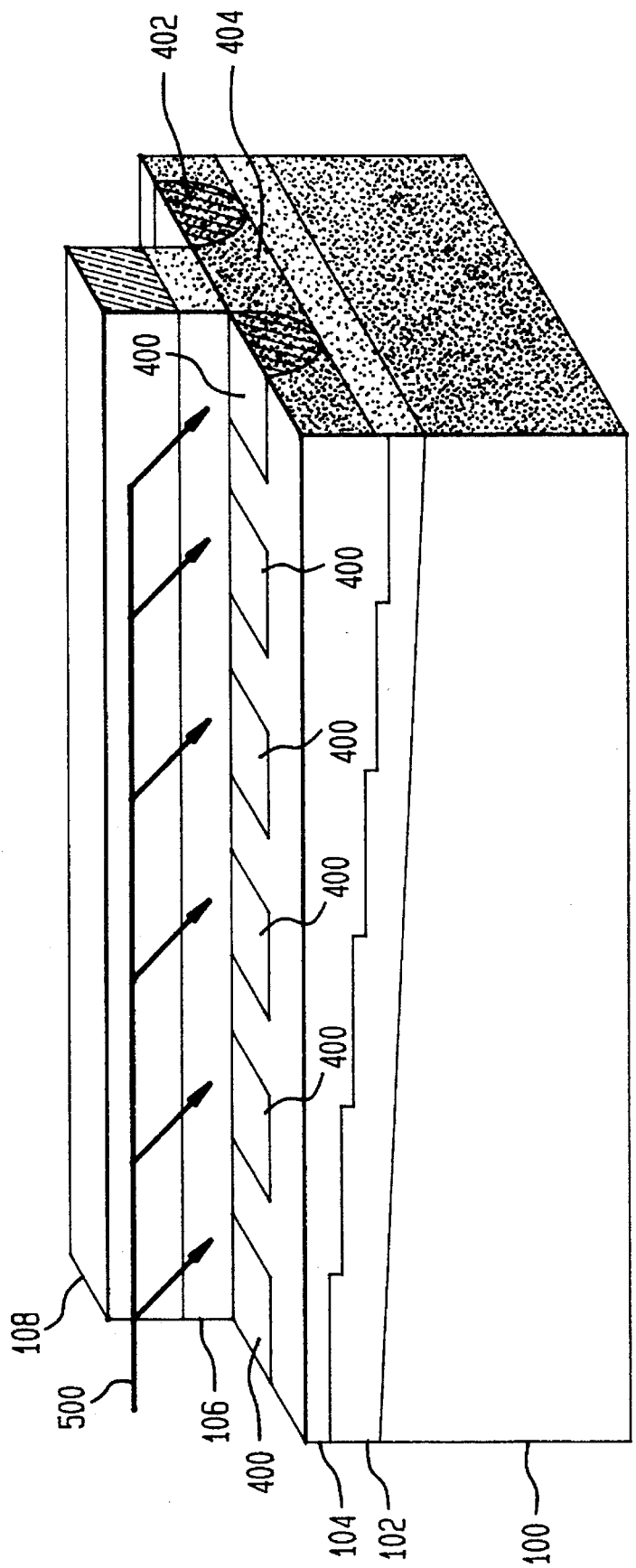
FIG. 5 shows how different wavelengths can be simultaneously extracted from the top waveguide into various photodetectors if the thickness of the silicon waveguide varies along the length of the device.

Since the two waveguides of this invention are highly asymmetric, strong wavelength sensitivity can be obtained with short coupling lengths, as described in eq. (1). This enables cascading different devices in series to obtain multi-wavelength operation. A schematic of such an implementation is shown in FIG. 5. The silicon waveguide (104) which is slightly absorbing at the wavelengths of interest is tapered or etched into steps so that its thickness changes along the device. Consequently, each part of the device responds to a slightly different wavelength. The p and n-junctions (400, 402) of each region are isolated, so that a number of diodes are obtained, with a p-n junction at each point of interest. When light that contains different wavelengths (500) is coupled to the top waveguide (108), each wavelength is extracted into a different diode and generates photocurrent corresponding to only that wavelength. Such a multi-wavelength photodiode can simultaneously receive a number of channels for parallel data communication.

Though the thickness and composition of the various layers can be calculated using standard techniques, a numerical example of a TE filter operating at 1.54 µm will elucidate the principles of this invention. A standard SOI wafer from SiBond L.L.C. (Hudson Valley Research Park, 1580 Route 52, Hopewell Junction, N.Y. 12533) consists of a buried 1 micron thick silicon dioxide layer (102) with a 2.5 µm thick silicon top layer (104). This commercial wafer is then oxidized to form an additional one micron thick silicon dioxide layer (106) on top of the wafer. In the process approximately 0.5 µm of silicon is consumed. After the oxidation, a polymer waveguide (108) is formed on the layers. Using commercial polymer waveguide material (Ultradel 9020—available from Amoco Chemical, P.O. Box 3011, Naperville, Ill. 60566), single mode ridge waveguides can be formed in a two step process. First a 5 µm thick blanket layer is deposited, then a 1 µm thick, 10 µm wide ridge is photolithographically produced. With a refractive index of 1.55 such a structure is effectively single mode in both tranverse and vertical directions, with higher order modes leaking out of the waveguide.

Calculating the propagation constant of the of the top polymer waveguide (108), we get 6.33 µm$^{-1}$. This matches the propagation constant of the ninth mode in the bottom silicon waveguide (104) at a wavelength of 1.54 µm. This phase-match wavelength is approximately proportional to the thickness of the silicon layer (104)—ie if we reduce the thickness 1% from 2 µm to 1.98 µm, the phase-matched wavelength would decrease from 1.54 µm to 1.525 µm. Thus a filter can be designed at any specific wavelength by tailoring the thickness of the silicon waveguide layer. The ninth mode in the bottom silicon waveguide (104) corresponds to a ray angle of 27.4 degrees to the normal, and the reflectivity of the one micron thick top (106) and bottom (104) cladding regions becomes 99.85% and 99.7% respectively. The finite reflectivity of the bottom cladding limits the total device length to less than about 2 mm, and can be increased if necessary by increasing the thickness of the bottom silicon dioxide layer. The reflectivity of the top silicon dioxide layer controls the coupling length, the device size, and the resolution of the filter. In this case the coupling causes the effective indices of the even and odd modes to split by 0.002, yielding a coupling length of about 400 µm, and a wavelength resolution of 0.8 nm. Thus for a channel dropping filter the processed wafer would be cleaved to a length of 400 µm, and the top waveguide (108) would be coupled to optical fibers to form the input and output of the device.

U.S. Patent Documents

| | | |
|---|---|---|
| 3,957,341 | 5/1976 | Taylor |
| 4,146,297 | 3/1977 | Alferness |
| 5,234,535 | 8/1993 | Beyer et al. |
| 5,343,542 | 8/1994 | Kash et. al. |
| 5,416,866 | 5/1995 | Sahlen et. al. |

References

1. "Integrated optics NxN multiplexer on silicon," C. Dragone et al., IEEE Photonics Technology Letters, vol. 3, p. 396–399, 1991.

2. "Monolithic InP/InGaAsP/InP grating spectrometer for the 1.48–1.56 mm wavelength range," J. B. D. Soole et al., Applied Physics Letters, vol. 58, p. 1949–51, 1991.

3. "Tunable optical waveguide directional coupler filter," R. C. Alferness et al., Applied Physics Letters, vol. 33, p. 161–163, 1978.

4. "Integrated rib waveguide-photodetector using Si/SiGe multiple quantum wells for long wavelengths", V. P. Kesan et al. Materials Research Society Symposium Proceedings, vol. 220, p. 483–488, 1991.

5. "InGaAsP/InP vertical directional coupler filter with optimally designed wavelength tunability", C. Wu et al., IEEE Photonics Technology Letters, vol. 4, p. 457–460, 1993.

6. "Vertical cavity devices as wavelength selective waveguides", B. Pezeshki et at., IEEE Journal of Lightwave Technology, vol. 12 p. 1791–1801, 1994.

The five U. S. Patent documents cited above ('341, '297, '535, '542, and '866) and six other documents (by C. Dragone et al., J. Soole et al., R. Alferness et al., V. Kesan et al., C. Wu et al., and B. Pezeshki et al., respectively) are incorporated herein by reference.

Having thus described our invention, what we claim as new and desire to secure by Letters Patents is:

1. An optical filter comprising:

an asymmetric waveguide directional coupler having two waveguides, one of said waveguides being a silicon waveguide substantially made of silicon and another of said waveguides being low index waveguide substantially made of a low index material, where said silicon waveguide extracts a selected wavelength from a plurality of wavelengths in said low index waveguide, where refractive indices and thicknesses of said two waveguides are adjusted so that said selected wavelength has the same propagation constant in said two guides, where said extraction of said selected wavelength into said silicon waveguide occurs without requiring a diffraction grating.

2. An apparatus as recited in claim 1, wherein said low index waveguide is split into two portions by a gap separating said two portions so that said selected wavelength in a first of said two portions is extracted into said silicon waveguide and is coupled back into a second of said two portions of said low index waveguide.

3. An apparatus as recited in claim 1, wherein said low index waveguide is an optical fiber.

4. An apparatus as recited in claim 1, further comprising:

p-n junctions for injecting electrical current into said silicon waveguide to tune said filter, where said selected wavelength extracted into said silicon waveguide will change to another of said wavelengths as said electrical current changes.

5. An apparatus as recited in claim 1, wherein said silicon waveguide varies in thickness along its length so as to extract different wavelengths of said wavelenghts at different points along its length.

6. A wavelength selective photodetector comprising:

a. a silicon waveguide substantially made of silicon;

b. a low index waveguide substantially made of a low index material, said silicon waveguide optically coupled to said low index waveguide; and c. means for inducing an electrical current in said silicon waveguide when a selected wavelength is extracted from a plurality of wavelengths confined in said low index waveguide to said silicon waveguide, the refractive indices and thicknesses of said silicon and said low index waveguide being adjusted such that said selected wavelength is phased matched in said silicon and said low index waveguides to extract said selected wavelengths into said silicon waveguide without requiring a defraction grading, and thereby inducing said electrical current in response to said selected wavelength being extracted into said silicon waveguide.

7. An apparatus as recited in claim 6, wherein said silicon waveguide varies in thickness along its length so that different selected wavelengths will induce electrical currents in said silicon waveguide at different positions along the length of the device.

8. An apparatus as recited in claim 1, wherein said silicon waveguide further comprises one or more absorbing layers of lower bandgap semiconductor material.

9. An apparatus as recited in claim 6, wherein said silicon waveguide further comprises one or more absorbing layers of lower bandgap semiconductor material.

* * * * *